United States Patent
Shan et al.

(10) Patent No.: US 10,230,513 B2
(45) Date of Patent: Mar. 12, 2019

(54) METHOD AND APPARATUS FOR TRANSMITTING/RECEIVING CONTROL CHANNEL IN WIRELESS COMMUNICATION SYSTEM

(71) Applicant: Samsung Electronics Co. Ltd., Suwon-si, Gyeonggi-do (KR)

(72) Inventors: Cheng Shan, Suwon-si (KR); Younsun Kim, Seongnam-si (KR); Kiil Kim, Yongin-si (KR); Hyojin Lee, Suwon-si (KR); Hyoungju Ji, Seoul (KR); Youngbum Kim, Seoul (KR); Sangmin Ro, Seoul (KR); Juho Lee, Suwon-si (KR); Joonyoung Cho, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 501 days.

(21) Appl. No.: 13/795,710

(22) Filed: Mar. 12, 2013

(65) Prior Publication Data

US 2014/0269519 A1 Sep. 18, 2014

(51) Int. Cl.
*H04W 72/04* (2009.01)
*H04L 5/00* (2006.01)

(52) U.S. Cl.
CPC .......... *H04L 5/0053* (2013.01); *H04L 5/0051* (2013.01); *H04L 5/0007* (2013.01)

(58) Field of Classification Search
None
See application file for complete search history.

(56) References Cited

U.S. PATENT DOCUMENTS

| 2011/0085506 | A1 | 4/2011 | Lee et al. |
| 2011/0249633 | A1 | 10/2011 | Hong et al. |
| 2011/0268062 | A1 | 11/2011 | Ji et al. |

(Continued)

FOREIGN PATENT DOCUMENTS

| EP | 2 528 244 A2 | 11/2012 |
| EP | 2 584 731 A2 | 4/2013 |

(Continued)

OTHER PUBLICATIONS

Erik Dahlman et al, "4G LTE/LTE-Advanced for Mobile Broadband—Chapter 10", 4G LTE/LTE Advanced for Mobile Broadband—Chapter 10, Mar. 29, 2011, pp. 145-202, SP055046016.

(Continued)

*Primary Examiner* — Jason E Mattis
*Assistant Examiner* — Hong Shao
(74) *Attorney, Agent, or Firm* — Jefferson IP Law, LLP

(57) ABSTRACT

A control channel transmission/reception method and apparatus is provided. The base station of the present invention transmits configuration information on a control channel to a terminal, checks an aggregation level for use in transmitting the control channel, maps Demodulation Reference Signal (DMRS) to resource elements in a resource block depending on the aggregation level, determines, when the resource elements of the DMRS correspond to a first resource element set, whether to map the DMRS to resource elements corresponding to a second resource element set in the resource block, and transmits the DMRS and control channel to the terminal according to the determination result.

16 Claims, 16 Drawing Sheets

(56) References Cited

U.S. PATENT DOCUMENTS

| | | |
|---|---|---|
| 2012/0033643 A1 | 2/2012 | Noh et al. |
| 2012/0188988 A1 | 7/2012 | Chung et al. |
| 2013/0034070 A1* | 2/2013 | Seo ................. H04B 7/155 |
| | | 370/329 |
| 2013/0064216 A1* | 3/2013 | Gao et al. .................. 370/330 |
| 2013/0301542 A1* | 11/2013 | Krishnamurthy et al. ... 370/329 |
| 2014/0050159 A1* | 2/2014 | Frenne ............... H04W 72/042 |
| | | 370/329 |

FOREIGN PATENT DOCUMENTS

| | | |
|---|---|---|
| KR | 10-2011-0038994 A | 4/2011 |
| KR | 10-2011-0112750 A | 10/2011 |
| WO | 2011/046349 A2 | 4/2011 |
| WO | 2011/090353 A2 | 7/2011 |
| WO | 2011/132988 A2 | 10/2011 |
| WO | 2013/073824 A1 | 5/2013 |

OTHER PUBLICATIONS

ZTE: "Discussion on DMRS based enhanced PDCCH transmission", 3GPP Draft, R1-120312, 3rd Generation Partnership Project (3GPP), Mobile Competence Centre; 650, Route Des Lucioles; F-06921 Sophia-Antipolis Cedex; France, vol. RAN WG1, No. Dresden, Germany, Feb. 2, 2012, XP050563305.

SAMSUNG: Further Discussions on DMRS-Based EPDCCH Transmission, 3GPP Draft; R1-121641, 3rd Generation Partnership Project (3GPP), Mobile Competence Centre ; 650, Route Des Lucioles ; F-06921 Sophia-Anti Polis Cedex ; France, vol. RAN WG1, No. Jeju, Korea; 20120326-20120330, Mar. 20, 2012 (Mar. 20, 2012), XP050599904.

\* cited by examiner

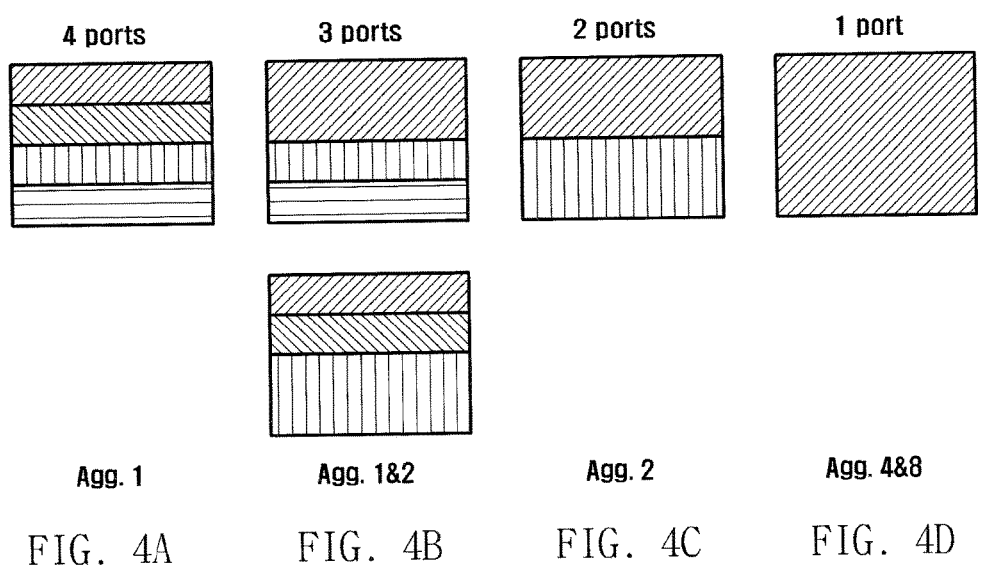

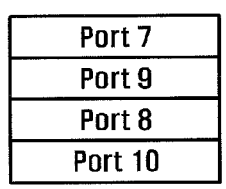 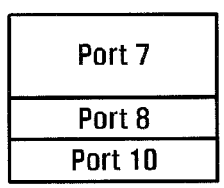 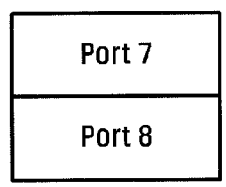 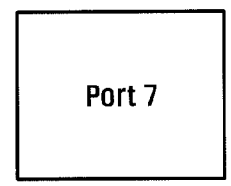
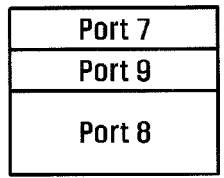
FIG. 7A    FIG. 7B    FIG. 7C    FIG. 7D

METHOD AND APPARATUS FOR TRANSMITTING/RECEIVING CONTROL CHANNEL IN WIRELESS COMMUNICATION SYSTEM

CROSS-REFERENCE TO RELATED APPLICATIONS

This application claims the benefit under 35 U.S.C. § 119(e) of a U.S. Provisional application filed on Mar. 12, 2012 in the U.S. Patent and Trademark Office and assigned Ser. No. 61/609,440, the entire disclosure of which is hereby incorporated by reference.

BACKGROUND OF THE INVENTION

1. Field of the Invention:

The present invention relates to a control channel transmission/reception method and apparatus for use in a wireless communication system. More particularly, the present invention is related to a method for determining a transmission scheme guaranteeing reliability of the information carried by the signals transmitted at a high order diversity level on the mobility channels with dynamic diversity in time and frequency domains.

2. Description of the Related Art:

In a wireless communication system including at least one evolved Node B (eNB) and at least one User Equipment (UE), the eNB schedules Downlink (DL) transmission to the UE and Uplink (UL) transmission from the UE. The UL and DL scheduling is performed in subframe units, and the scheduling information is transferred from the eNB to the UE through the control channel at each DL subframe.

In the following description, the 3rd Generation Partnership Project (3GPP) Long-Term Evolution (LTE) releases 8 to 10 systems are referred to as legacy system(s) while the release 11 or later systems are referred to as proposed system(s) that may be implemented according to exemplary embodiments of the present invention. Exemplary embodiments of the present invention are also capable of being applied to other cellular systems.

The downlink data is transmitted through Physical Downlink Shared Channel (PDSCH). Downlink Control Information (DCI) includes Downlink Channel Status Information (DL CSI) feedback request per UE and Uplink Transmission Scheduling Assignments (UL SAs) for uplink transmissions of the UEs or Downlink Scheduling Assignments (DL SAs) for UEs to receive PDSCHs. The scheduling assignments (SAs) are transmitted through DCI formats carried by Physical Downlink Control Channels (PDCCHs). In addition to the SAs, the PDCCHs carry a DCI common in all UEs or a group of UEs.

The 3GPP LTE-Advanced (LTE-A) system adopts Orthogonal Frequency Division Multiple Access (OFDMA) for downlink in which the system bandwidth is divided into multiple subcarriers. A group of 12 consecutive subcarriers is referred to as Resource Block (RB). An RB is the basic unit of resource allocation in the LTE/LTE-A system.

FIG. 1 is a diagram illustrating the structure of a resource allocation unit for use in an LTE/LTE-A system according to the related art.

Referring to FIG. 1, the basic unit of resource allocation of the LTE/LTE-A system is a subframe in the time domain. As shown in FIG. 1, a subframe consists of 14 consecutive Orthogonal Frequency Division Multiple (OFDM) symbols. Resource Element (RE) is the smallest unit, and is made up of 1 OFDM symbol x one subcarrier. A single modulation symbol is mapped to a resource element.

As shown in FIG. 1, different time and frequency resources can be used for transmitting different types of signals. A Cell-specific Reference Signal (CRS) is transmitted to support UE mobility in such a situation of initial attach and handover and legacy PDSCH transmission modes. The Demodulation Reference Signal (DMRS) is transmitted to support new PDSCH transmission modes. The control channels are transmitted to notify the UE of the size of control region and DL/UL scheduling assignments (SAs) and ACK/NACK for UL HARQ operation.

The Channel Status Information Reference Signal (CSI-RS) is the reference signal for use in downlink channel measurement of the UE for CSI feedback. The CSI-RS may be transmitted in a certain group of resource elements marked with indices A to J. In addition, the zero power CSI-RS or muted CSI-RS can be configured in the case where the resource elements marked with the indices A to J are not used for transmitting any of reference signals, data signals, and/or control signals. The zero power CSI-RS or muted CSI-RS is used for enhancing the measurement performance of the UEs receiving the CSI-RSs from neighbor transmission points in the LTE-A system.

PDSCH is transmitted in the data region corresponding to the REs not used for transmission of any of CRS, DMRS, CSI-RS, and zero power CSI-RS.

As described above, the eNB transmits PDCCH for various purposes such as UL/DL scheduling allocation and CSI-RS feedback request indication in the legacy LTE/LTE-A system. In the original characteristics of the OFDMA system which achieves system throughput enhancement with multi-user transmission and frequency selective scheduling, it becomes necessary to transmit multiple PDCCHs addressed to the multiple UEs. In addition, the adoption of Multi-User Multiple Input Multiple Output (MU-MIMO) for PDSCH transmission to spatially distributed UEs requires simultaneous transmission of PDCCHs to the multiple UEs.

In 3GPP releases 8 to 10, the control channel is transmitted at the beginning of the subframe in order for the UE to acquire the scheduling information quickly and thus perform data decoding efficiently. The Physical Downlink Control Channel (PDCCH) is configured to be transmitted 1 to 3 OFDM symbols at the beginning of the subframe.

The number of the OFDM symbols for use in transmitting PDCCH is indicated by Physical Control Format Indication Channel (PCFICH) mapped to the first OFDM symbol. One PDCCH is carried by L Control Channel Elements (CCEs). L denotes CCE aggregation level and can be 1, 2, 4, or 8. A CCE consists of 36 subcarriers distributed across the system bandwidth.

In order to secure the control channel resource enough for transmitting UL/DL resource allocation information, Enhanced Physical Data Control Channel (E-PDCCH or ePDCCH) has been introduced as a new Control Channel (CCH) to overcome the shortage of PDCCH capacity in LTE-A release 11. In the case of E-PDCCH, a newly defined Enhanced Control Channel Element (E-CCE) replaces the legacy CCE. It differs from the CCE in that E-CCE is defined in the data region rather than the control region of the resource block.

The major cause for the PDCCH resource shortage is that the PDCCH transmission is transmitted in 1 to 3 OFDM symbols at the beginning of the subframe. Furthermore, the frequent MU-MUMO transmission with scheduling multiple UEs on the same frequency and time resources aggravates lack of PDCCH resource significantly. In order to address this issue, E-PDCCH is designed to be transmitted in the data region of a subframe along with PDSCH unlike the legacy PDCCH. The DMRS is the reference signal designed for the E-PDCCH.

A description of PDCCH transmission is described below.

At the transmitter side, the eNB adds user-specific Cyclic Redundancy Checks (CRCs) to multiple PDCCHs, encodes CRC-added PDCCHs independently depending on CCE aggregation level of 1, 2, 4, or 8, performs rate-matching on the encoded PDCCHs, multiplexes the rate-matched PDCCHs, and maps the multiplexing result to PDCCH resources. At the receiver side, the UE estimates the CCE aggregation level and searches for the PDCCHs in a predetermined search space using the user-specific CRC. Before locating and identifying PDCCHs, the UE performs blind decoding of a set of candidate channels to determine which contains its signaling information.

In the 3GPP LTE releases 8 to 10, PDCCH is transmitted using Space Frequency Block Code (SFBC) through multiple transmit antennas of the eNB. SFBC is a transmission scheme in order for the UE to receive the single modulation symbol transmitted by the eNB with diversity order 2. Assuming a channel h1 from the eNB's transmit antenna 1 to the UE and another channel h2 from the eNB's transmit antenna 2 to the UE, the SFBC transmission allows the UE to recover the modulation signal scaled to $|h1|^2+|h2|^2$. If the modulation signal is received through $|h1|^2+|h2|^2$, this means that the modulation signal has been transmitted with diversity order 2. Without application of the SFBC transmission scheme, only the diversity order 1 is achievable in the flat fading channel environment. Typically, if high diversity order is possible, this means that the transmission signal is robust to the radio channel variation in the time or frequency domain. By achieving high diversity order, it is possible to recover the original signal with low error probability as compared to the case of a low diversity order.

In 3GPP, SFBC is performed with CRC as common reference signal used for multiple UEs attached to the same cell. In addition, the SFBC is transmitted. The SFBC-based transmit diversity scheme is advantageous in the situation of significant channel variation in time or frequency domain. By spreading the transmission signal widely, it is possible to achieve high diversity order and thus secure the throughput reflecting average state of the radio channel.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problem and/or disadvantages and to provide at least the advantages described below. Accordingly, an aspect of the present invention is to provide a method for indicating Demodulation Reference Signal (DMRS) configuration information implicitly for Enhanced Physical Data Control Channel (E-PDCCH) transmission.

In accordance with an aspect of the present invention, a control channel transmission method of a base station in a wireless communication system is provided. The method includes transmitting configuration information on a control channel to a terminal, determining an aggregation level for use in transmitting the control channel, mapping a Demodulation Reference Signal (DMRS) to resource elements in a resource block based on the aggregation level, determining, when the resource elements of the DMRS correspond to a first resource element set, whether to map the DMRS to resource elements corresponding to a second resource element set in the resource block, and transmitting the DMRS and control channel to the terminal according to the determination result.

In accordance with another aspect of the present invention, a control channel transmission method of a base station in a wireless communication system is provided. The method includes transmitting configuration information on a control channel to a terminal, determining an aggregation level for use in transmitting the control channel, mapping a Demodulation Reference Signal (DMRS) to resource elements in a resource block based on the aggregation level, determining, when the resource elements of the DMRS correspond to a first resource element set, whether to boost a transmit power of the resource elements corresponding to the first resource element set with the transmit power of the resource elements corresponding to the second resource element set, and transmitting the DMRS and control channel to the terminal according to the determination result.

In accordance with another aspect of the present invention, a control channel reception method of a terminal in a wireless communication system is provided. The method includes receiving configuration information on a control channel from a base station, determining an aggregation level used for transmitting the control channel, determining resource elements to which a Demodulation Reference Signal (DMRS) is mapped in a resource block based on the aggregation level, determining, when the resource elements of the DMRS correspond to a first resource element set, whether to assume mapping the DMRS to resource elements corresponding to a second resource element set in the resource block, and receiving the DMRS and control channel according to the determination result.

In accordance with another aspect of the present invention, a control channel reception method of a terminal in a wireless communication system is provided. The method includes receiving configuration information on a control channel from a base station, determining an aggregation level used for transmitting the control channel, determining resource elements to which a Demodulation Reference Signal (DMRS) is mapped in a resource block based on the aggregation level, determining, when the resource elements of the DMRS correspond to a first resource element set, whether to assume that a transmit power of the resource elements corresponding to the first resource element set is boosted with the transmit power of the resource elements corresponding to the second resource element set, and receiving the DMRS and control channel according to the determination result.

In accordance with another aspect of the present invention, a base station for transmitting a control channel in a wireless communication system is provided. The base station includes a transceiver which communicates with a terminal, and a control unit which controls transmitting configuration information on a control channel to the terminal, determining an aggregation level for use in transmitting the control channel, mapping a Demodulation Reference Signal (DMRS) to resource elements in a resource block based on the aggregation level, determining, when the resource elements of the DMRS correspond to a first resource element set, whether to map the DMRS to resource elements corresponding to a second resource element set in the resource block, and transmitting the DMRS and control channel to the terminal according to the determination result.

In accordance with another aspect of the present invention, a base station for transmitting a control channel in a wireless communication system is provided. The base station includes a transceiver which communicates with a terminal, and a control unit which controls transmitting configuration information on a control channel to the terminal, determining an aggregation level for use in transmitting the control channel, mapping a Demodulation Reference Signal (DMRS) to resource elements in a resource block based on the aggregation level, determining, when the resource elements of the DMRS correspond to a first resource element set, whether to boost a transmit power of the resource elements corresponding to the first resource element set with the transmit power of the resource elements corresponding to the second resource element set, and transmitting the DMRS and control channel to the terminal according to the determination result.

In accordance with another aspect of the present invention, a terminal for receiving a control channel in a wireless communication system is provided. The terminal includes a transceiver which communicates with a base station, and a control unit which controls receiving configuration information on a control channel from the base station, determining an aggregation level used for transmitting the control channel, determining resource elements to which a Demodulation Reference Signal (DMRS) is mapped in a resource block based on the aggregation level, determining, when the resource elements of the DMRS correspond to a first resource element set, whether to assume mapping the DMRS to resource elements corresponding to a second resource element set in the resource block, and receiving the DMRS and control channel according to the determination result.

In accordance with another aspect of the present invention, a terminal for receiving a control channel in a wireless communication system is provided. The terminal includes a transceiver which communicates with a base station, and a control unit which controls receiving configuration information on a control channel from the base station, determining an aggregation level used for transmitting the control channel, determining resource elements to which a Demodulation Reference Signal (DMRS) is mapped in a resource block based on the aggregation level, determining, when the resource elements of the DMRS correspond to a first resource element set, whether to assume that a transmit power of the resource elements corresponding to the first resource element set is boosted with the transmit power of the resource elements corresponding to the second resource element set, and receiving the DMRS and control channel according to the determination result.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A-4D are diagrams illustrating exemplary radio resource allocation for Enhanced Physical Data Control Channel (E-PDCCH) depending on aggregation level in a control channel transmission method according to an exemplary embodiment of the present invention;

FIGS. 7A-7D are diagrams illustrating a principle of determining DMRS port based on E-CCE index in a control channel transmission method according method according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
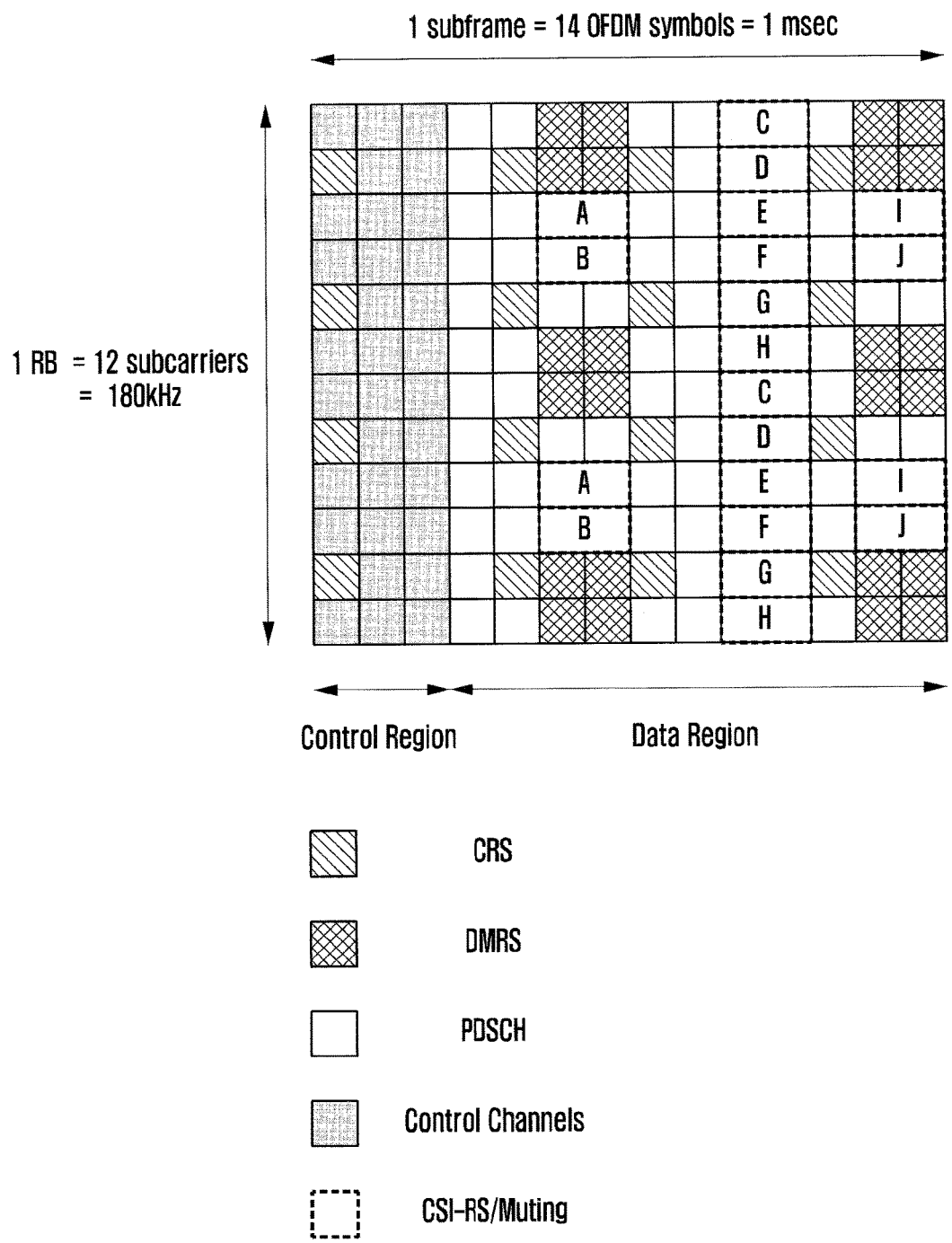
FIG. 1 is a diagram illustrating the structure of a resource allocation unit for use in a Long-Term Evolution/Long-Term Evolution-Advanced (LTE/LTE-A) system according to the related art.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the descriptions are directed to the Orthogonal Frequency Division Multiple (OFDM) based wireless communication systems, especially 3rd Generation Partnership Project (3GPP) Evolved Universal Terrestrial Radio Access (EUTRA) systems, it will be understood by those skilled in the art that exemplary embodiments of the present invention can be applied even to other communication systems having the similar technical background and channel format, with a slight modification, without departing from the spirit and scope of the present invention.

Exemplary embodiments of the present invention are described hereinafter in detail with reference to accompanying drawings.

Typically, Physical Data Control Channel (PDCCH) transmission includes transmitting Downlink Control Information (DCI). There may be multiple DCIs transmitted to a User Equipment (UE) in a subframe. Also, a DCI may be addressed to one or more UEs. In the case that a downlink grant indicates the transmission properties and resources for Physical Downlink Shared Channel (PDSCH) transmission in the current subframe while an uplink grant indicates the transmission properties and resources for PUSCH transmission in uplink subframes, multiple DCI formats exist.

PDCCH addressed to a UE can be transmitted as distributed across the system bandwidth to achieve frequency diversity gain. In this way, the PDCCH transmitted to the corresponding UE is capable of acquiring averaged radio channel performance in the frequency domain.

Although effective to acquire the averaged radio channel performance, it is also disadvantageous in achieving beamforming performance gain. Beamforming is a technique of optimizing beamforming coefficient per transmit antenna in multi-antenna transmission to maximize the reception signal strength at the receiving end. The per-transmit antenna beamforming coefficient is determined according to the radio channel condition between the corresponding transmit antenna and a receive antenna of the UE.

The major difference between the beamforming and the transmit diversity is in that the transmit diversity aims at averaging the radio channels while the beamforming aims at optimizing the corresponding radio channel. Typically, the beamforming is superior to the transmit diversity in throughput but has a drawback in that the UEs have to transmit channel status information to the evolved Node B (eNB). Also, the beamforming does not guarantee optimized performance in an environment where the radio channel varies frequently in the frequency or time domain.

The UE-specific reference signals, known as Demodulation Reference Signals (DMRS), are introduced to the system for simplified implementation of beamforming transmission. The multiple antennas are precoded with different weights. In 3rd Generation Partnership (3GPP) Long-Term Evolution (LTE) releases 8 to 10, the UE-specific reference signals are precoded with the same precoder as the data transmitted in the same resource block. Since the same precoding is applied to the data and reference signals in the same resource block, the UE is capable of estimating the precoding effect from the UE-specific reference signal without extra information. Accordingly, even though the UE does not know the accurate precoder information, the UE is capable of decoding the received signal under the assumption that the signals are transmitted from the virtual antenna ports.

Figure 2:
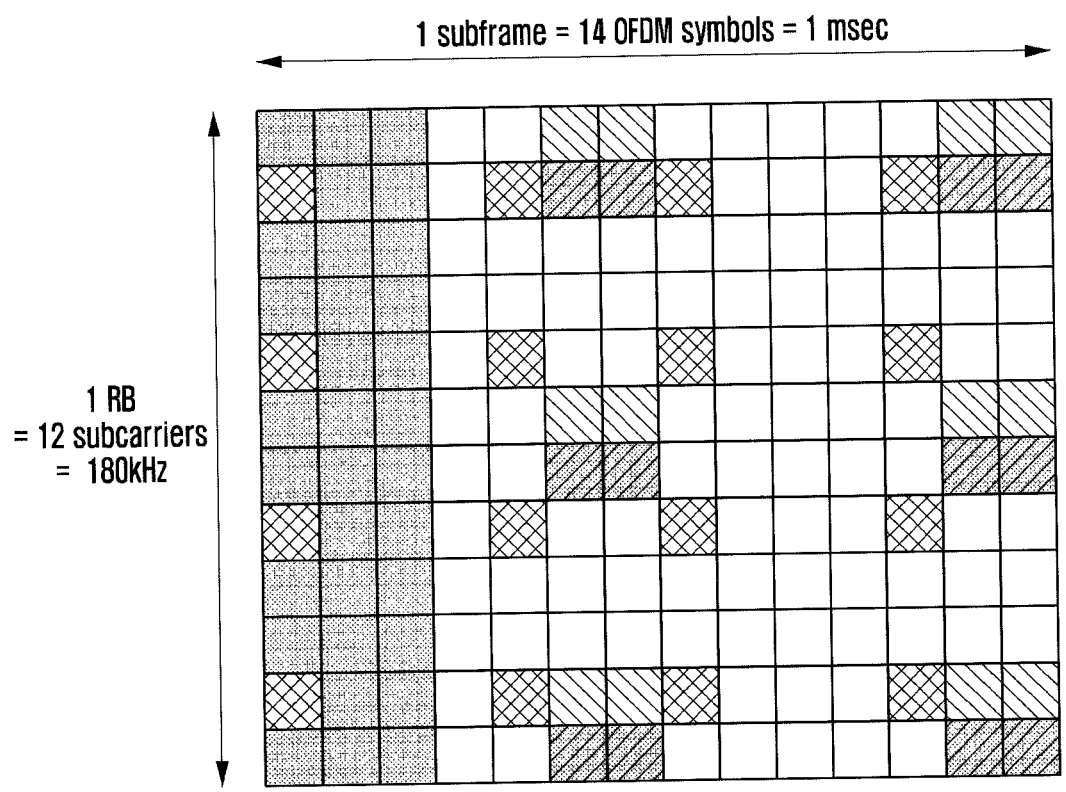
FIG. 2 is a diagram illustrating an arrangement of Demodulation Reference Signals (DMRSs) in a resource block for use in the Long-Term Evolution-Advanced (LTE-A) system according to an exemplary embodiment of the present invention.

FIG. 2 is a diagram illustrating the arrangement of DMRSs in a resource block for use in the Long-Term Evolution-Advanced (LTE-A) system according to an exemplary embodiment of the present invention.

Referring to FIG. 2, the positions of DMRSs in a Resource Block (RB) of 3GPP release 10 supporting up to 8 antenna ports #7 to #14 are shown. In the case of using up to 4 DMRS ports, the antenna ports #7/8/9/10 use two spreading factors for multiplexing 2 DMRS ports on the consecutive REs in the time domain. In the case that at least one of the antenna ports #11/12/13/14 is used additionally, however, four spreading factors are used for multiplexing 4 DMRS ports on the 4 consecutive REs in the subcarrier domain.

As described above, Enhanced Physical Data Control Channel (E-PDCCH) is mapped to the legacy PDSCH region to enhance the legacy PDCCH capacity. The E-PDCCH transmission is supported with the DMRS to make it possible to transmit the E-PDCCH at Multimedia Broadcast Single Frequency Network (MBSFN) subframe carrying no Cell-specific Reference Signal (CRS).

In the legacy system, DMRS is used for PDSCH decoding. The DMRS configuration properties includes a number of DMRS ports and scrambling sequence ID. The UE is notified of the DRMS configuration properties using the DCI of PDCCH. In the case that the DMRS is used for E-PDCCH transmission, however, the DMRS configuration information cannot be transmitted through the control channel in advance. There is therefore a need for a method for the UE to acquire the DMRS configuration information.

The E-PDCCH adopted in the LTE/LTE-A release 11 is capable of supporting both the transmit diversity and beamforming schemes. The UE is capable of receiving E-PDCCH for use in one of the beamforming scheme and the transmit diversity scheme depending on the determination of the eNB. These are referred to as localized mode transmission and distributed mode (or interleaved mode) transmission of E-PDCCH. In the LTE/LTE-A system, the interleaved mode and distributed mode are distinguished as follows.

Distributed mode: Enhanced Control Channel Element (E-CCE) is a basic unit of resource to which E-PDCCH is mapped and is composed of REs belonging to multiple RBs.

Localized mode: E-CCE is a basic unit of resource to which E-PDCCH is mapped and is composed of REs belonging to one RB.

In the Long-Term Evolution/Long-Term Evolution-Advanced (LTE/LTE-A) system, when the E-PDCCH is transmitted in the localized mode with beamforming, the DMRS is used as shown in FIG. 2. A UE receives the E-PDCCH thereto with one of plural DMRS ports. When the E-PDCCH is transmitted in the localized mode, the eNB applies the same beamforming to the E-PDCCH addressed to a specific UE and the DMRS port therefor. The UE performs channel estimation with the DMRS transmitted with the same beamforming as the E-PDCCH to check the precoding and radio channel condition and perform channel recovery and decoding on the E-PDCCH.

In receiving E-PDCCH, there is a need for information identifying which of the DMRS ports is to be used. Typically, one or more E-PDCCH can be transmitted in the RB as shown in FIG. 1 or FIG. 2. In this case, it is necessary that the eNB and UE know the DMRS ports associated with respective E-PDCCHs. At this time, the radio resource utilization efficiency depends on which DMRS port the E-PDCCH is associated with. That is, if the association between E-PDCCH and DMRS port is not optimized, this may cause resource waste and unintended interference.

Exemplary embodiments of the present invention propose a method for optimizing the association between E-PDCCH and DMRS port for E-PDCCH transmission in the localized mode. When the E-CCE is configured in localized manner, it is possible to define the association between E-PDCCH and DMRS.

FIGS. 3A-3D are diagrams illustrating exemplary configurations of RB having four E-CCEs for use in a control channel transmission method according to an exemplary embodiment of the present invention.

Figure 3A:
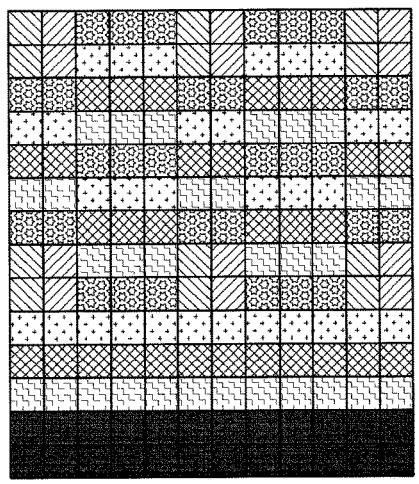
FIGS. 3A-3D are diagrams illustrating exemplary configurations of Resource Block (RB) having four Enhanced Control Channel Elements (E-CCEs) for use in a control channel transmission method according to an exemplary embodiment of the present invention.
Figure 3B:
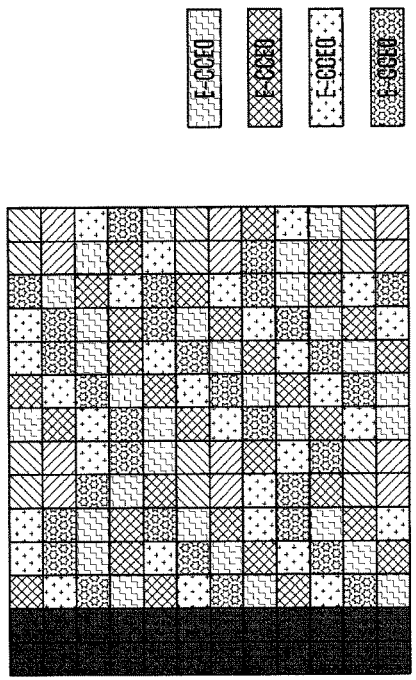
Figure 3C:
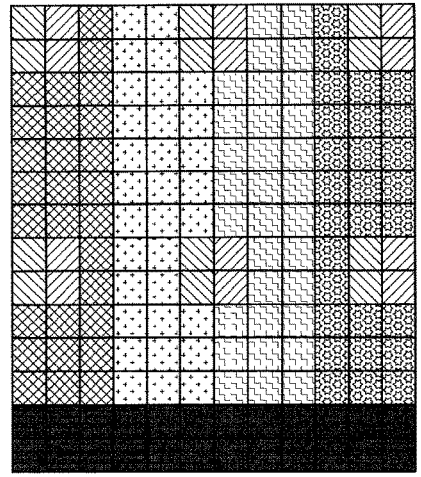
Figure 3D:
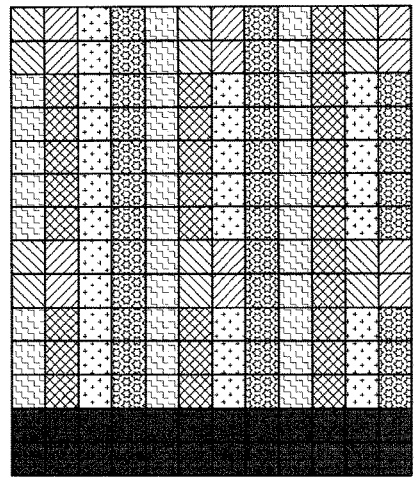

Referring to FIGS. 3A-3D, one logical E-CCE consists of a set of consecutive REs in an RB as shown in FIG. 3A or a set of non-consecutive REs as shown in FIGS. 3B-3D. The RB of FIG. 3A is the case where each E-CCE occupies three consecutive subcarriers. The RB of FIG. 3B is the case where each E-CCE is composed of REs of equally spaced OFDM symbols. The RB of FIG. 3C is the case where each E-CCE is composed of REs of equally spaced subcarriers. Finally, the RB of FIG. 3D is the case where each E-CCE is composed of REs distributed in frequency and time domains. As described above, the REs designated for E-PDCCH transmission are not overlapped with the REs designated for legacy PDCCH and reference signals.

As shown in FIGS. 3A-3D, one RB may include four logical E-CCEs. One E-PDCCH can be mapped to 1, 2, 4, or 8 E-CCEs depending on the aggregation level. In the E-PDCCH transmission in localized mode is performed with multiple E-CCEs in one RB. In the case that 4 E-CCEs exist in one RB, the E-PDCCH(s) occupies ¼, ½, 2, and 2 RBs for the respective aggregation levels 1, 2, 4, and 8.

FIGS. 4A-4D are diagrams illustrating exemplary radio resource allocations for E-PDCCH depending on aggregation level in a control channel transmission method according to an exemplary embodiment of the present invention.

Referring to FIGS. 4A-4D, the E-PDCCH of aggregation level 1 can start from any E-CCE of index i as shown in FIG. 4A. The E-PDCCH of aggregation level 2 can start from the E-CCE fulfilling i mod 2=0 (i is E-CCE index) as shown in FIGS. 4B and 4C. The E-PDCCH of aggregation 4 can start from the E-CCE fulfilling i mod 4=0 (i is E-CCE index) as shown in FIG. 4D. Likewise, the E-PDCCH of aggregation level 8 can start from the E-CCE fulfilling i mod 8=0 (i is E-CCE index).

According to an exemplary embodiment of the present invention, it is assumed that one E-PDCCH transmission is a rank-1 transmission with one DMRS port. Even though the eNB and the UE have multiple transmit/receive antennas, one E-PDCCH is transmitted on one spatial layer other than multiple spatial layers. Of course, the transmission method according to exemplary embodiments of the present invention can be extended to the cases of transmitting one E-PDCCH is transmitted on multiple spatial layers. For example, if rank-2 transmission is used, two DMRS ports are used for transmitting the E-PDCCH.

In the case that four E-PDCCHs are transmitted at aggregation level 1 respectively in one RB as shown in FIG. 4A, four DMRS ports are necessary. Each DMRS port is associated with a specific E-PDCCH so as to be used for estimation the E-PDCCH. In the case that three E-PDCCHs are transmitted, two at aggregation level 1 and one at aggregation level 2, in one RB as shown in FIG. 4B, 3 DMRS ports are necessary for the respective E-PDCCHs. In the case that two E-PDCCHs are transmitted at aggregation 2 respectively in one RB, 2 DMRS ports are necessary as shown in FIG. 4C. Finally, in the case that one E-PDCCH is transmitted at aggregation level 4 or 8 in one RB, one DMRS port is necessary as shown in FIG. 4D.

In the LTE/LTE-A system, a UE does not know how many E-CCEs are used for transmitting E-PDCCH before decoding E-PDCCH successfully. The UE attempts decoding E-PDCCH at every aggregation level. If the decoding is successful at an aggregation level, the UE is aware of the aggregation level at which the PDCCH has been transmitted. Such a process of decoding without accurate information on the aggregation level is referred to as blind decoding.

As described above, since the number of DMRS ports varies depending on the aggregation level for E-PDCCH transmission, the DMRS resource to be assumed for blind decoding of E-PDCCH is determined depending on the assumed aggregation level. The UE assumes the DMRS resource depending on the aggregation level.

The UE should know whether the DMRS ports 9 and 10 are configured in advance. This can be achieved through two approaches.

The first approach is to assume the allocation of all DMRS resources regardless of the aggregation level for E-PDCCH transmission.

Figure 5:
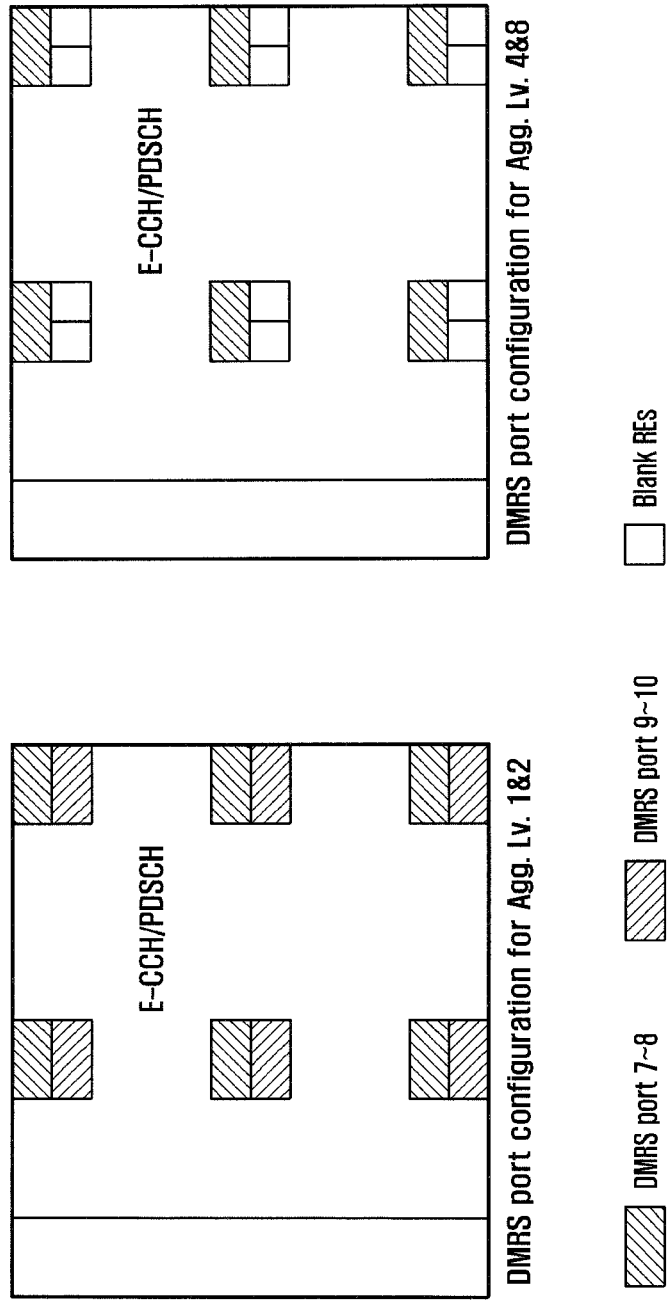
FIG. 5 is a diagram illustrating exemplary DMRS resource allocation for E-PDCCH assumed by User Equipment (UE) in a control channel transmission method according to an exemplary embodiment of the present invention.

FIG. 5 is a diagram illustrating exemplary DMRS resource allocation for E-PDCCH assumed by a UE in a control channel transmission method according to an exemplary embodiment of the present invention.

Referring to FIG. 5, in the first approach, the UE assumes that the radio resources of DMRS ports 7, 8, 9, and 10 are not allocated for E-PDCCH signal regardless of the assumed aggregation level for E-PDCCH transmission.

If the UE assumes aggregation level 1 or 2, all of the DMRS ports 7, 8, 9, and 10 are necessary. Otherwise, if the UE assumes the aggregation level 4 or 8, then the UE assumes that if the DMRS for E-PDCCH transmission is DMRS port 7 or 8 the E-PDCCH is not transmitted on the resource of DMRS ports 9 and 10. Although the radio resources of the DMRS ports 9 and 10 are not used for E-PDCCH transmission, the transmit power saved by muting E-PDCCH transmission at DMRS ports 9 and 10 can be used to boost the transmit power of the DMRS port 7 or 8. The transmit power saved at the REs corresponding to DMRS ports 9 and 10 can be used to increase the transmit power at the DMRS port 7 or 8 because the DMRS ports 7, 8, 9, and 10 are transmitting the signals existing in the same time domain. In the case of aggregation level 4 or 8, the UE is capable of increasing the DMRS transmission power with the transmit power saved at the REs to which no DMRS is mapped so as to increase the channel estimation performance of the UE, resulting in improvement of E-PDCCH reception performance.

Figure 6:
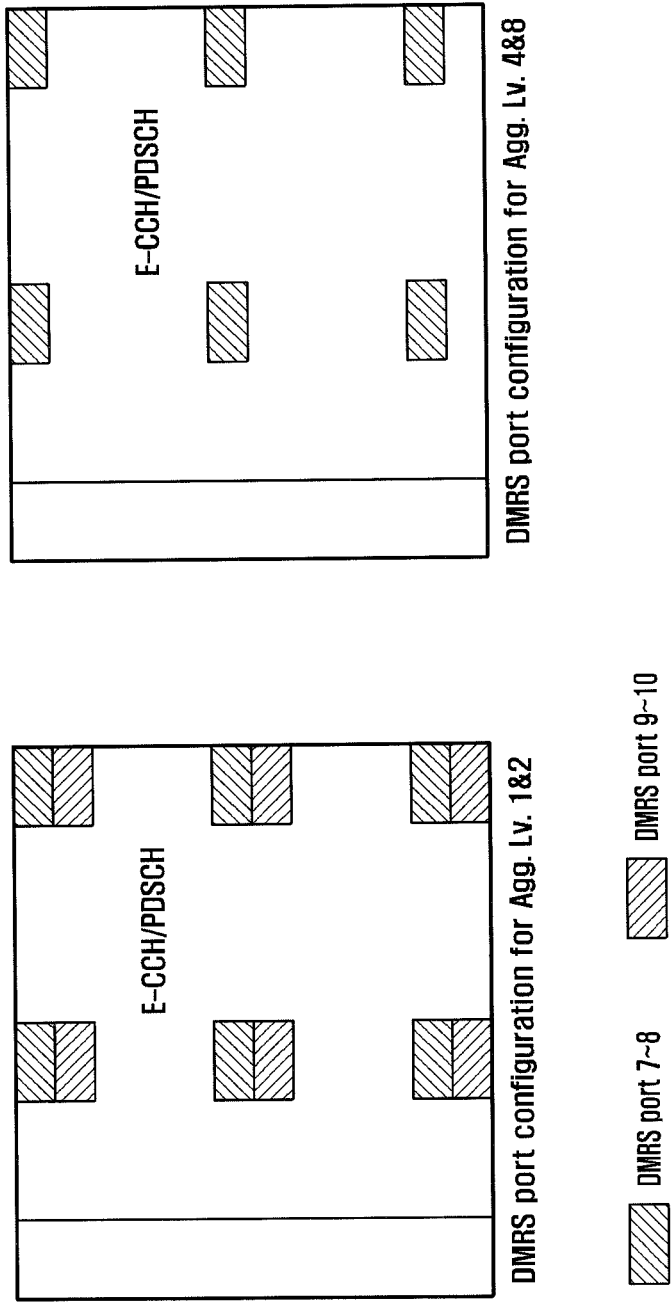
FIG. 6 is a diagram illustrating exemplary DMRS resource allocation for E-PDCCH assumed by a UE in a control channel transmission method according to another exemplary embodiment of the present invention.

FIG. 6 is a diagram illustrating exemplary DMRS resource allocation for E-PDCCH assumed by a UE in a control channel transmission method according to another exemplary embodiment of the present invention.

Referring to FIG. 6, in the second approach, the UE assumes that the DMRS radio resource not used by the UE at aggregation level 4 or 8 is used for E-PDCCH transmission. The radio resource assumed by the UE for receiving E-PDCCH varies depending on the assumed aggregation level. The second approach is inferior to the first approach in view of the channel estimation performance; however, it is possible to use more radio resource for E-PDCCH, resulting in improvement of E-PDCCH reception performance.

According to an exemplary embodiment of the present invention, it is assumed that the DMRS resource saved according to the first approach of FIG. 5 is not allocated to the UE for E-PDCCH transmission.

According to an exemplary embodiment of the present invention, it is assumed that the DMRS port information for receiving E-PDCCH is signaled by the UE through a control signal or acquired from other information. For example, the eNB may notify the UE of the DMRS port for receiving E-PDCCH through higher layer signaling. Also, the DMRS port assumed by the UE can be inferred via multiple parameters. The parameters may include subframe index, RB index, UE ID, etc.

FIGS. 7A-7D are diagrams illustrating a principle of determining DMRS port based on E-CCE index in a control channel transmission method according to an exemplary embodiment of the present invention.

Referring to FIGS. 7A-7D, the DMRS port for transmitting E-PDCCH is determined according to Equation (1):

$$n_{DMRS\text{-}port}^{E\text{-}CCH} = \begin{cases} 7, & i_{starting}^{E\text{-}CCE} \mod 4 = 0 \\ 8, & i_{starting}^{E\text{-}CCE} \mod 4 = 2 \\ 9, & i_{starting}^{E\text{-}CCE} \mod 4 = 1 \\ 10, & i_{starting}^{E\text{-}CCE} \mod 4 = 3 \end{cases} \quad (1)$$

In Equation (1), $n_{DMRS\text{-}port}^{E\text{-}CCH}$ denotes the number of DMRS port allocated for E-PDCCH, and $i_{starting}^{E\text{-}CCE}$ denotes the index of E-CCE at which E-PDCCH starts. According to an exemplary embodiment of the present invention, the UE assumes that all DMRS resources are allocated regardless of aggregation level for E-PDCCH transmission as shown in FIG. 5. Accordingly, the eNB allocates the radio resources of four DMRS ports for DMRS transmission regardless of the aggregation level for E-PDCCH transmission but not for E-PDCCH transmission.

When the UE performs reception operation under the assumption of aggregation level 1 or 2 for receiving E-PDCCH, the UE assumes 4 DMRS ports of which radio resources are not used for E-PDCCH signal transmission. The UE also receives specific DMRS for used in receiving its E-PDCCH which is used for channel estimation. However, when the UE performs reception operation under the assumption of aggregation level 4 or 8, the UE assumes the DMRSs to which the same precoding is applied are transmitted on the radio resources of the DMRS ports 7 and 8 and the radio resources of the DMRS ports 9 and 10.

The UE assuming the aggregation level 4 or 8 for E-PDCCH transmission assumes that the DMRS for E-PDCCH is transmitted through the DMRS ports 7 and 9 with the application of the same precoding to the two DMRS ports or that the DMRS for E-PDCCH is transmitted through the DMRS ports 8 and 10 with the application of the same precoding to the two DMRS ports. In the case that the same precoding is applied to the two DMRS ports, the UE is capable of combining the signals transmitted through the two DMRS ports to improve the channel estimation accuracy.

Figure 8B:
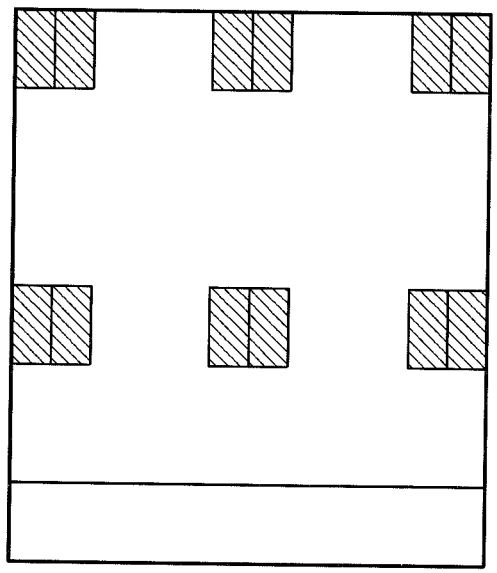
FIGS. 8A-8B are diagrams illustrating exemplary cases of DMRS resource allocation regardless of an aggregation level for E-PDCCH transmission in a control channel transmission method according to an exemplary embodiment of the present invention.
Figure 8A:
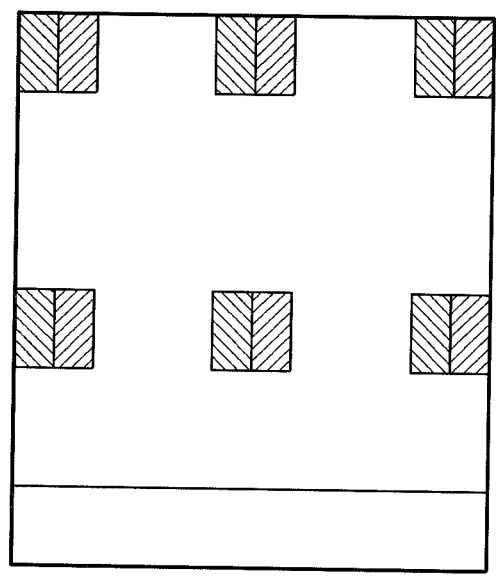

FIGS. 8A-8B are diagrams illustrating exemplary cases of DMRS resource allocation regardless of an aggregation level for E-PDCCH transmission in a control channel transmission method according to an exemplary embodiment of the present invention.

Referring to FIGS. 8A-8B, FIG. 8A shows the case of using all DMRS ports 7, 8, 9, and 10 for the UE to receive the E-PDCCH at aggregation level 1 or 2. FIG. 8B shows the case where the UE receives E-PDCCH at aggregation level 4 or 8 under the assumption that the DMRS is transmitted through DMRS ports 7 and 9 to which the same precoding has been applied or the DMRS is transmitted through DMRS ports 8 and 10 to which the same precoding has been applied.

In the case that the DMRS signal transmitted through the DMRS port 7 or 8 is transmitted through the DMRS port 9 or 10 with the same precoding at the aggregation level 4 or 8 for E-PDCCH transmission as described above, the channel performance of the UE can be enhanced via the following techniques:

1. The UE calculates an average of the DMRS signals transmitted through DMRS ports 7 and 9 and acquires the channel estimation value by inputting the average to the DMRS channel estimator. This is the case when the DMRS signals are transmitted through DMRS ports 8 and 10.

2. The UE performs channel estimation with individual DMRS signals transmitted through DMRS ports 7 and 9 and acquires the average of the estimation results. This is the case when the DMRS signals are transmitted through DMRS ports 8 and 10.

3. The UE combines the DMRS signals transmitted through the DMRS ports 7 and 9 and inputs the combination result to the DMRS channel estimator to acquire a channel estimation value. This is the case when the DMRS signals are transmitted through DMRS ports 8 and 10.

As described above, the technique of transmitting the DMRS signal by applying the same precoding to multiple DMRS ports in an RB to improve the channel performance is referred to as intra-RB port bundling.

The technique of transmitting multiple same DMRS signals in an RB simultaneously at the aggregation level 4 or 8 as described in the above exemplary embodiment can be expended to the case of aggregation level 2. In this case, the relationship between DMRS port and the first E-CCE for transmitting E-PDCCH is determined by Equation (1) as follows, and the DMRS ports are allocated as shown in FIGS. 7B-7C:

If the first E-CCE for E-PDCCH transmission starts at 0th E-CCE in the E-CCE RB, the DMRS port 7 is designated for the corresponding E-PDCCH.

If the first E-CCE for E-PDCCH transmission starts at 1st E-CCE in the E-CCE RB, the DMRS port 9 is designated for the corresponding E-PDCCH.

If the first E-CCE for E-PDCCH transmission starts at 2nd E-CCE in the E-CCE RB, the DMRS port 8 is designated for the corresponding E-PDCCH.

If the first E-CCE for E-PDCCH transmission starts at 3rd E-CCE in the E-CCE RB, the DMRS port 10 is designated for the corresponding E-PDCCH.

By applying the above rule, when performing E-PDCCH reception under the assumption of aggregation level 2, the UE may assumes that another DMRS port has to be designated in addition to the DMRS port designated according to the above rule. When the DMRS port 7 has been designated according to the above rule, the UE assuming aggregation level 2 as shown in FIGS. 7B-7C may assume that the DMRS port 9 has to be designated to in addition to the DMRS port 7. Likewise, when the DMRS port 8 has been designated according to the above rule, the UE assuming aggregation level 2 as shown in FIGS. 7B-7C may assume that the DMRS port 10 has to be designated to in addition to the DMRS port 7.

In summary, the DMRS ports available in the system are divided into plural groups, and each group is allocated at least one DMRS port. Such a DMRS port grouping can be implemented according to the method specified in the standard document or through higher layer signaling. Each group is allocated resource per E-CCE depending on the aggregation level. Assuming that the E-PDCCH has been mapped to specific E-CCE(s), if plural DMRS ports are included in the group determined for the corresponding E-CCE, the UE assumes that the same precoding has been applied to the corresponding DMRS ports.

Another exemplary embodiment of the present invention proposes a method for mitigating interference to other UE which is caused by increasing the transmit power of a specific DMRS port.

As described above with reference to FIG. 5, assuming that all DMRS resources are allocated regardless of aggregation level, the transmit power saved by muted DMRS port resource can be used for increasing the transmit power of other DMRS port.

Figure 9:
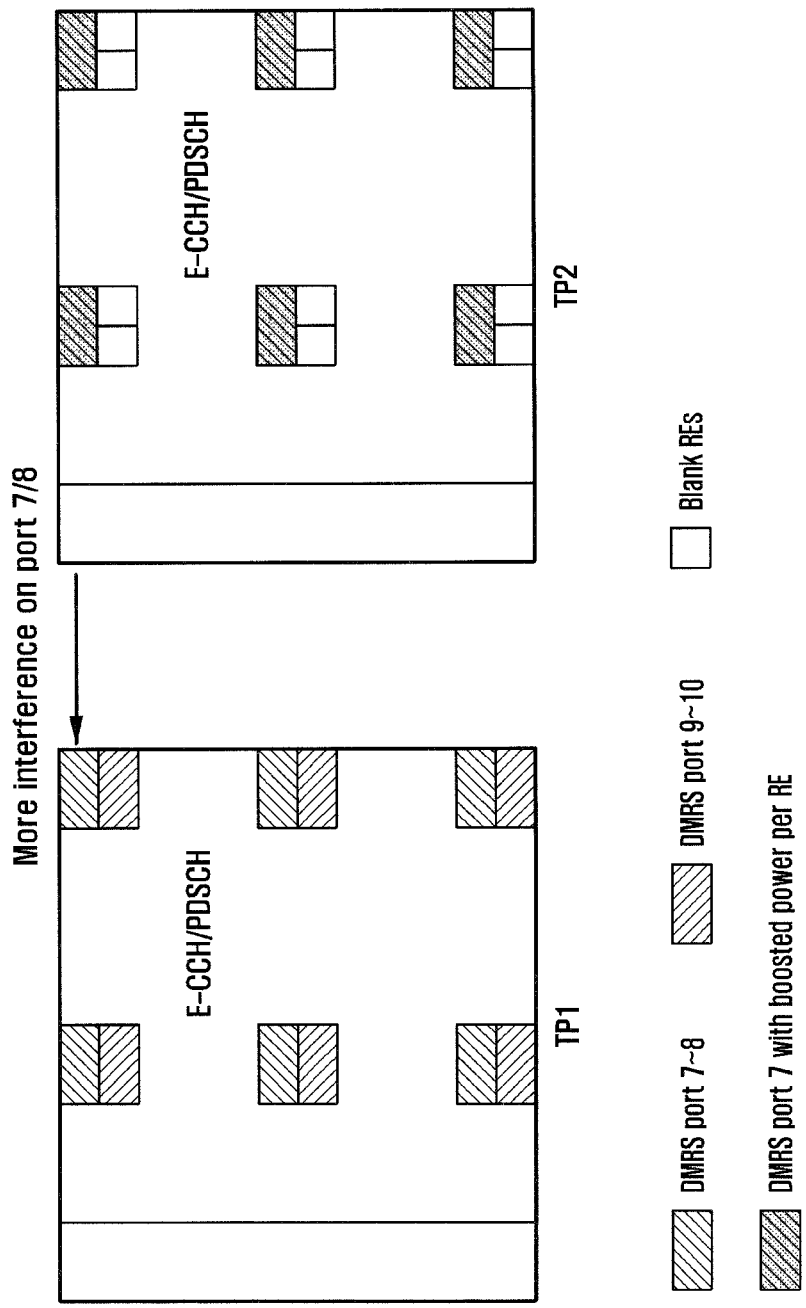
FIG. 9 is a diagram illustrating a principle of increasing transmit power of DMRS ports for E-PDCCH transmission with saved transmit power of a muted DMRS port in a control channel transmission method according to an exemplary embodiment of the present invention.

FIG. 9 is a diagram illustrating a principle of increasing a transmit power of DMRS ports for E-PDCCH transmission with saved transmit power of a muted DMRS port in a control channel transmission method according to an exemplary embodiment of the present invention.

Referring to FIG. 9, the signal is transmitted at two transmission points (TP1 and TP2). The DMRS ports 7/8 is used at TP2 at the transmit power boosted with the power saved by muting the transmission through the DMRS port 9/10.

Although there is no interference caused by the muted transmission through the DMRS port 9/10, the transmission through the DMRS port 7/8 at TP2 causes interference increased due to the boosted transmit power. In this case, the reception performance of the UE which receives E-PDCCH at TP2 is enhanced, but the reception performance of the UE which receives E-PDCCH at TP1 is degraded. The problem explained with reference to FIG. 9 occurs when the eNB transmits E-PDCCH at aggregation level 4 or 8.

In order to address this issue, exemplary embodiments of the present invention propose a method of changing the DMRS ports for transmitting the E-PDCCH at aggregation level 4 or 8 dynamically. With the application of this method, it is possible to assign the DMRS port 7 for E-PDCCH while muting transmission through DMRS port 9/10 or assign the DMRS port 9 for E-PDCCH while muting transmission through DMRS port 7/8 in every RB carrying E-PDCCH at aggregation level 4 or 8 depending on the determination of the eNB.

Figure 10:
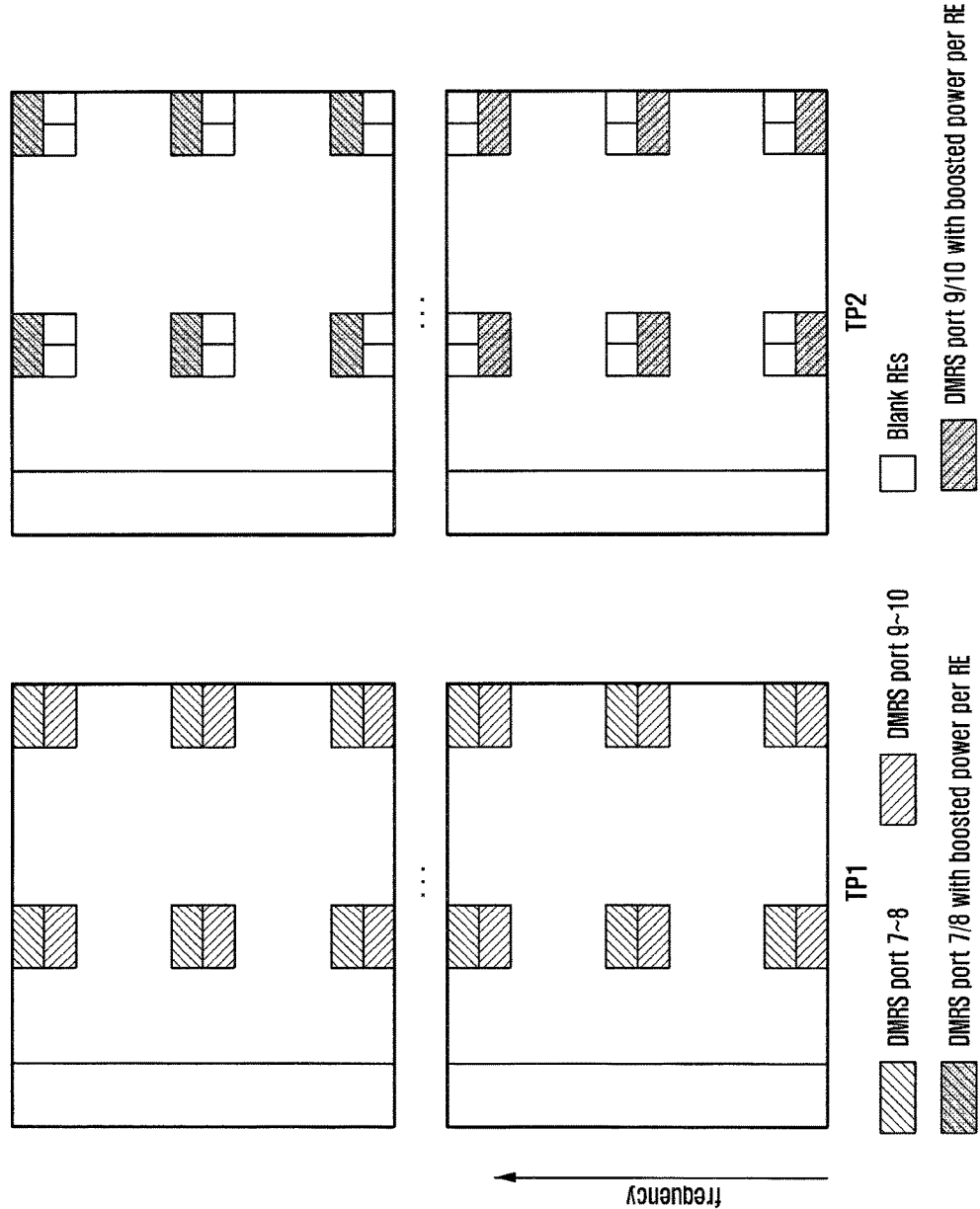
FIG. 10 is a diagram illustrating a principle of assigning the DMRS port dynamically at every RB carrying E-PDCCH in a control channel transmission method according to an exemplary embodiment of the present invention.

FIG. 10 is a diagram illustrating a principle of assigning a DMRS port dynamically at every RB carrying E-PDCCH in a control channel transmission method according to an exemplary embodiment of the present invention.

Referring to FIG. 10, the E-PDCCH mapped in the upper RB at TP2 is transmitted through DMRS port 7 at aggregation level 4 while the E-PDCCH mapped in the lower RB at TP2 is transmitted through DMRS port 9 at aggregation level 8. By using the different DMRS radio resources in different frequency bands, it is possible to prevent the signal transmitted at other transmission point from causing interference to specific DMRS port.

At aggregation level 4 or 8, the DMRS port to be used can be determined using Equation (2):

$$n_{DMRS\text{-}port}^{E\text{-}CCE} = \begin{cases} 7, & X\bmod 4 = 0 \\ 8, & X\bmod 4 = 2 \\ 9, & X\bmod 4 = 1 \\ 10, & X\bmod 4 = 3 \end{cases} \quad (2)$$

In Equation (2), X denotes a predefined variable or function value. The variable X can be defined using Equation (3):

$$X = n_{RB} + i_{starting}^{E\text{-}CCE} \quad (3)$$

In Equation (3), $n_{RB}$ denotes the number of RB having the first E-CCE for transmitting the corresponding E-PDCCH, and $i_{starting}^{E\text{-}CCE}$ denotes the index of the E-CCE from which the E-PDCCH starts in the RB.

X may also be defined as a function of subframe index, Cell ID, UE ID, etc. Another method for determining X is for the eNB notifies the UE of the value of X. The eNB may notify of X through higher layer signaling or physical layer signaling.

Once the DMRS port has been determined depending on X, the corresponding UE can receive E-PDCCH.

In summary, assuming aggregation level 4 or 8 for receiving E-PDCCH, the UE determines the DMRS port per RB using Equations (2) and (3) or based on the information transmitted by the eNB.

Figure 11:
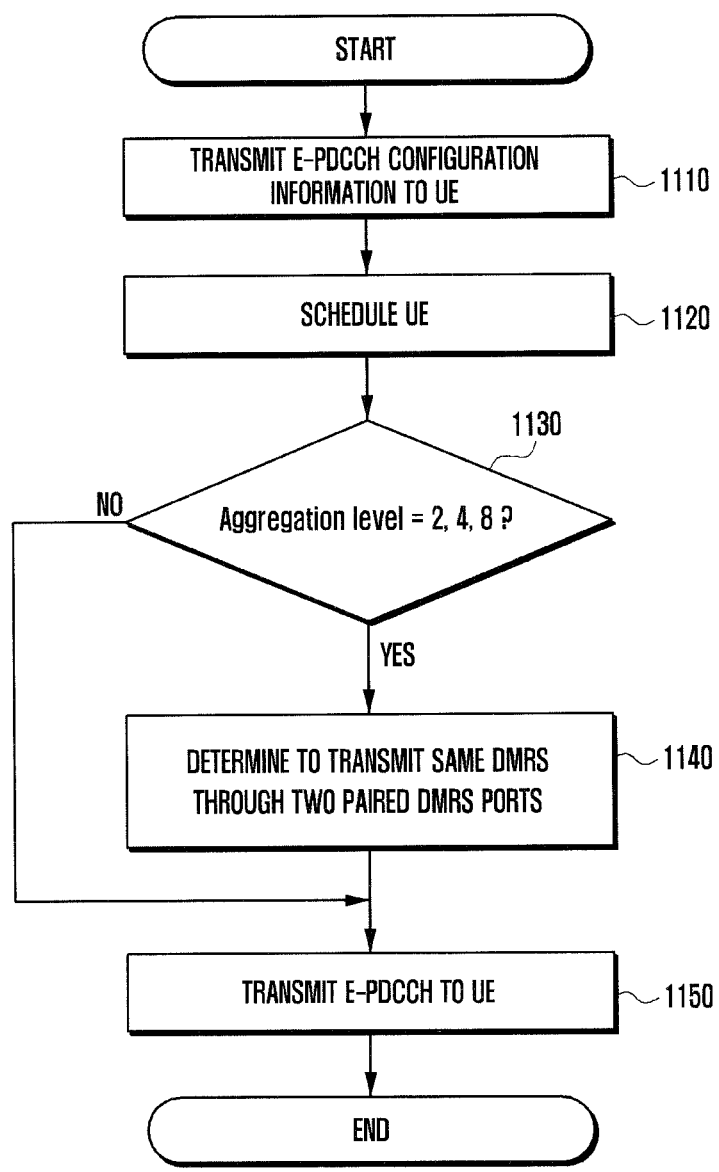
FIG. 11 is a flowchart illustrating an evolved Node B (eNB) procedure of allocating DMRS resource and transmitting E-PDCCH in a control channel transmission method according to a first exemplary embodiment of the present invention.

FIG. 11 is a flowchart illustrating an eNB procedure of allocating DMRS resource and transmitting E-PDCCH in a control channel transmission method according to a first exemplary embodiment of the present invention.

Referring to FIG. 11, the eNB configures the UE to receive E-PDCCH at step 1110. The E-PDCCH configuration may be transmitted through higher layer signaling (RRC signaling) and may include information on the E-PDCCH region in RB and DMRS port used by the eNB.

The eNB schedules the UE in each subframe at step 1120. The E-PDCCH scheduling information may include aggregation level for E-PDCCH transmission and E-CCE(s) to which E-PDCCH is mapped.

The eNB determines the aggregation level for transmitting E-PDCCH at step 1130, and assigns a DMRS port to the UE depending on the aggregation level and maps the DMRS to the REs of the RB at step 1140. According to an exemplary embodiment of the present invention, since it is assumed that the E-PDCCH is transmitted DMRS-based localized mode, the eNB allocates the DMRS port according to a predetermined rule at step 1130. The DMRS port configuration depending on the aggregation level for E-PDCCH transmission has been described above with reference to FIGS. 7A-7D.

If the aggregation level determined at step 1130 is one of the aggregation levels 2, 4, and 8, the eNB configures two paired DMRS ports to transmit the DMRS signals to which the same precoding has been applied at step 1140.

Finally, the eNB transmits the E-PDCCH symbols mapped to the E-CCE(s) to the UE at step 1150.

Figure 12:
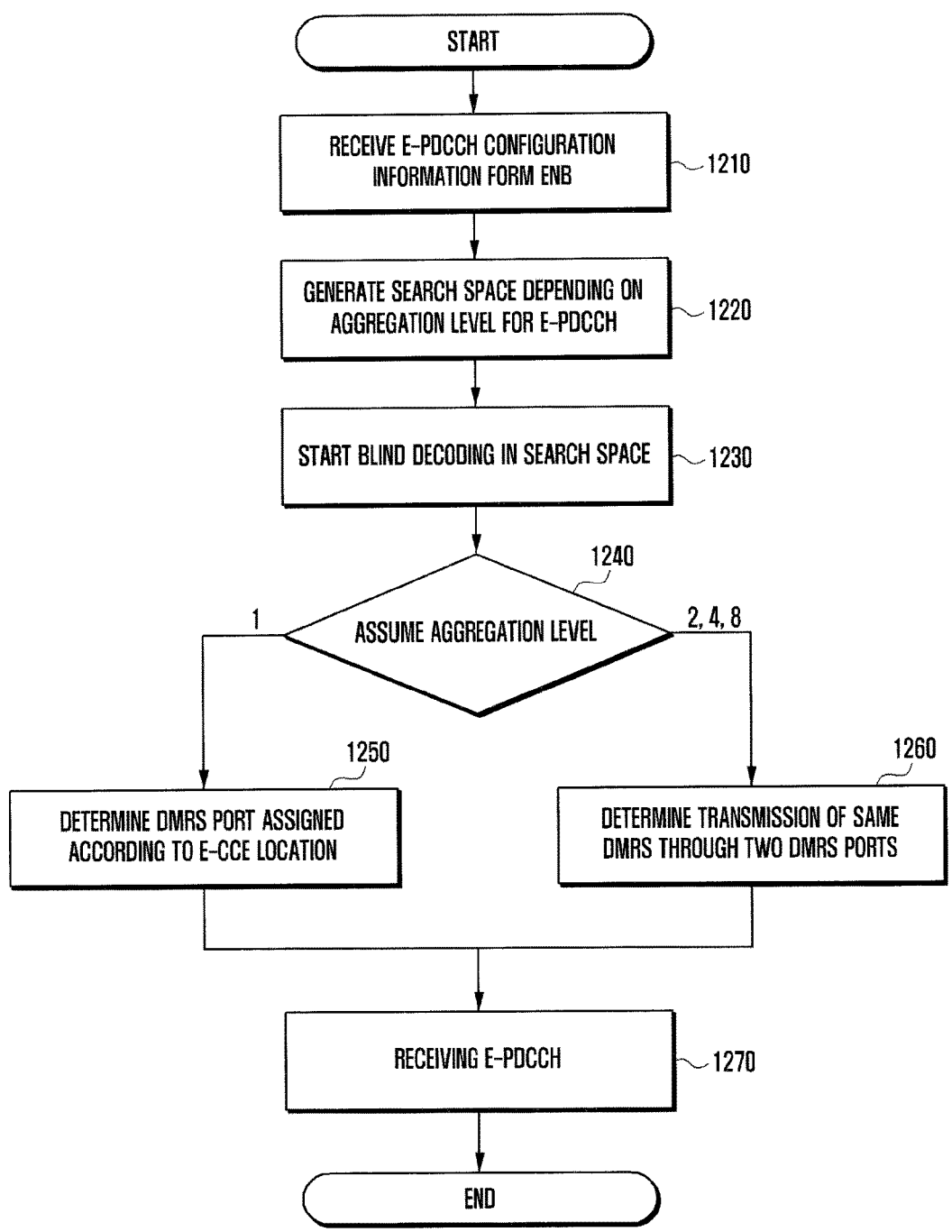
FIG. 12 is a flowchart illustrating a UE procedure of receiving E-PDCCH transmitted by an eNB in a control channel transmission method according to the first exemplary embodiment of the present invention.

FIG. 12 is a flowchart illustrating a UE procedure of receiving E-PDCCH transmitted by an eNB in the control channel transmission method according to a first exemplary embodiment of the present invention.

Referring to FIG. 12, the UE receives E-PDCCH configuration information from the eNB at step 1210. As described above, since the localized mode E-PDCCH transmission is assumed, the UE generates a search space for blind decoding depending on the aggregation level for E-PDCCH transmission at step 1220.

The UE starts blind decoding in the search space at step 1230 under the assumption, as described above, that all DMRS resources are not used for E-PDCCH transmission regardless of the aggregation level for E-PDCCH.

The UE assumes an aggregation level at step 1240. If aggregation level 1 is assumed, the UE determines the DMRS ports assigned according to the location of E-CCE for E-PDCCH at step 1250. If one of aggregation levels 2, 4, and 8 is assumed, the UE performs DMRS channel estimation using the additional DMRS port to which the same precoding has been applied as the DMRS port assigned depending on the location of the first E-CCE for E-PDCCH transmission at step 1260.

Finally, the UE receives the E-PDCCH successfully through blind decoding at step 1270 and performs follow-up operation such as data reception based on the control information of E-PDCCH.

Figure 13:
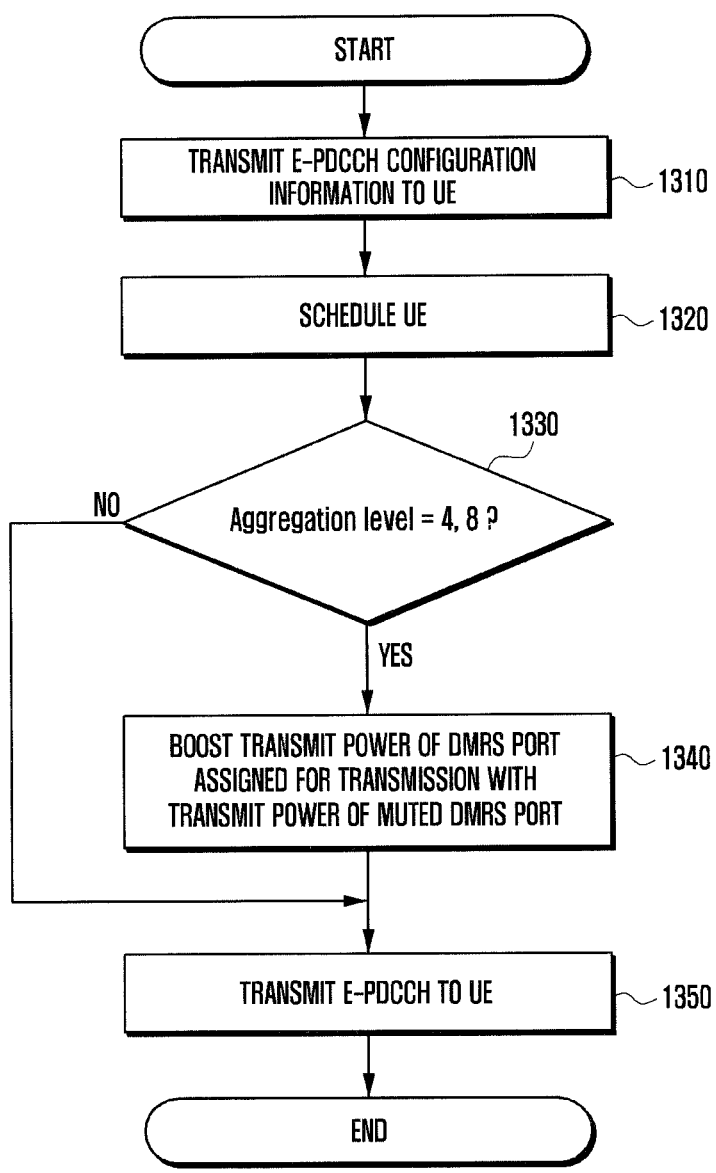
FIG. 13 is a flowchart illustrating an eNB procedure of allocating DMRS resource and transmitting E-PDCCH in a control channel transmission method according to a second exemplary embodiment of the present invention.

FIG. 13 is a flowchart illustrating an eNB procedure of allocating DMRS resource and transmitting E-PDCCH in a control channel transmission method according to a second exemplary embodiment of the present invention.

Referring to FIG. 13, the eNB configures the UE to receive E-PDCCH at step 1310. The E-PDCCH configuration can be transmitted through higher layer signaling (RRC signaling) and may include information on the E-PDCCH region in RB and DMRS port used by the eNB.

The eNB schedules the UE in each subframe at step 1320. The E-PDCCH scheduling information may include aggregation level for E-PDCCH transmission and E-CCE(s) to which E-PDCCH is mapped.

The eNB determines the aggregation level for transmitting E-PDCCH at step 1330 and assigns a DMRS port to the UE depending on the aggregation level and maps the DMRS to the REs of the RB at step 1340. According to an exemplary embodiment of the present invention, since it is assumed that the E-PDCCH is transmitted DMRS-based localized mode, the eNB allocates the DMRS port according to a predetermined rule at step 1330. The DMRS port configuration depending on the aggregation level for E-PDCCH transmission has been described with reference to FIGS. 7A-7D.

If the aggregation level determined at step 1330 is one of the aggregation levels 4 and 8, the eNB boosts the transmit power of the DMRS port assigned to the UE with the transmit power saved by muting transmission through the DMRS port which is one of two paired DMRS ports at step 1340.

Finally, the eNB transmits the E-PDCCH symbols mapped to the E-CCE(s) to the UE at step 1350.

Figure 14:
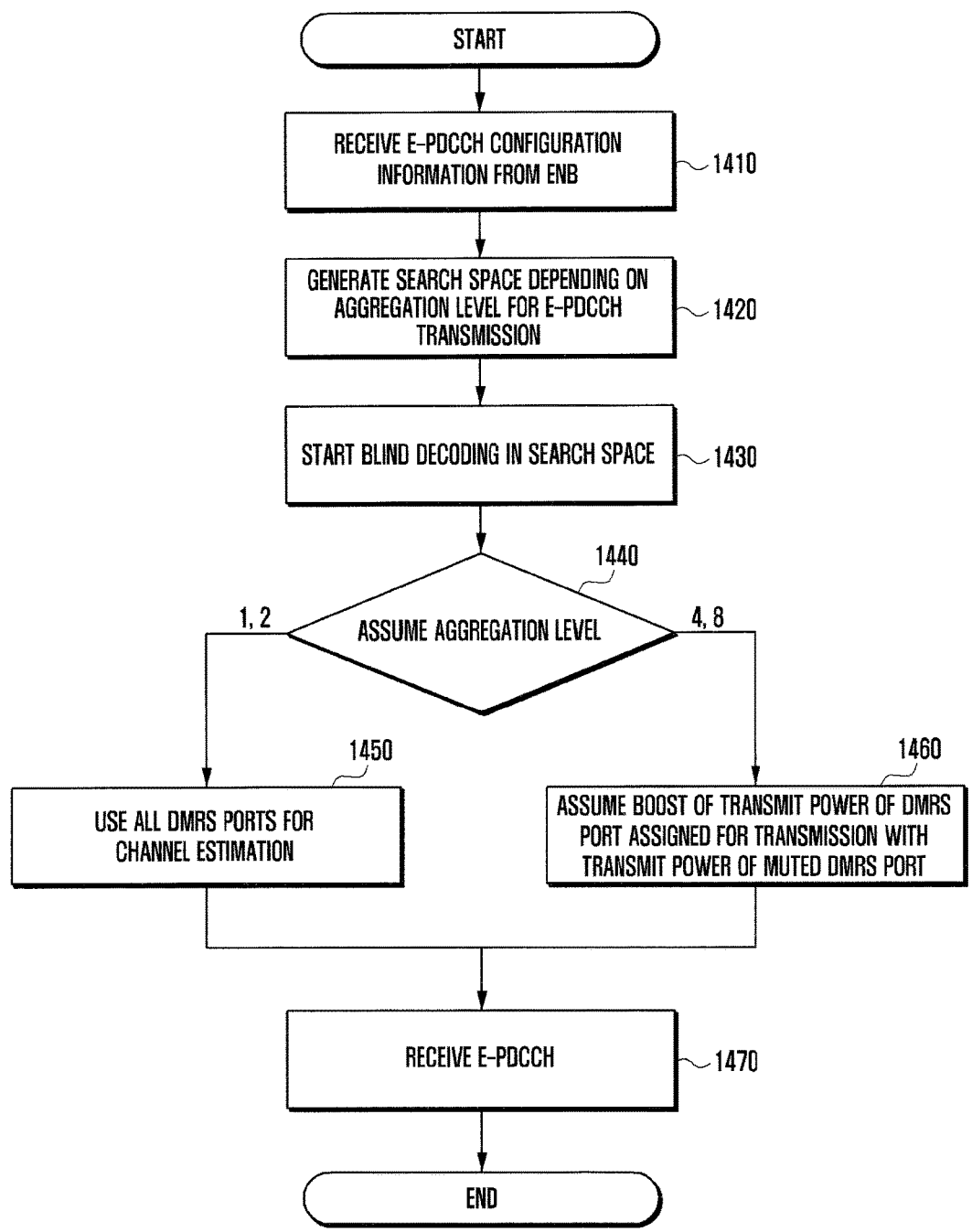
FIG. 14 is a flowchart illustrating a UE procedure of receiving E-PDCCH transmitted by an eNB in a control channel transmission method according to the second exemplary embodiment of the present invention.

FIG. 14 is a flowchart illustrating a UE procedure of receiving E-PDCCH transmitted by an eNB in a control channel transmission method according to the second exemplary embodiment of the present invention.

Referring to FIG. 14, the UE receives E-PDCCH configuration information from the eNB at step 1410. As described above, since the localized mode E-PDCCH transmission is assumed, the UE generates a search space for blind decoding depending on the aggregation level for E-PDCCH transmission at step 1420.

The UE starts blind decoding in the search space at step 1430 under the assumption, as described above, that all DMRS resources are not used for E-PDCCH transmission regardless of the aggregation level for E-PDCCH.

The UE assumes an aggregation level at step 1440. If aggregation level 1 or 2 is assumed, the UE determines that all the DMRS ports are used for channel estimation at step 1450. If aggregation level 4 or 8 is assumed, performs DMRS channel estimation under the assumption that the transmit power of the DMRS port assigned to the UE has been boosted with the power saved by muting transmission through the other DMRS port which is one of two paired DMRS ports at step 1460.

Finally, the UE receives the E-PDCCH successfully through blind decoding at step 1470 and performs follow-up operation such as data reception based on the control information of E-PDCCH.

Figure 15:
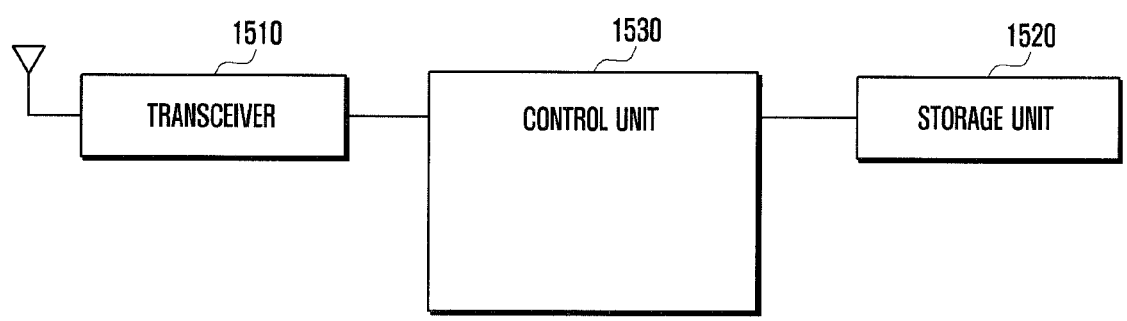
FIG. 15 is a block diagram illustrating a configuration of an eNB according to an exemplary embodiment of the present invention.

FIG. 15 is a block diagram illustrating a configuration of an eNB according to an exemplary embodiment of the present invention.

Referring to FIG. 15, the eNB according to an exemplary embodiment of the present invention includes a transceiver 1510, a storage unit 1520, and a control unit 1530.

The transceiver 1510 is responsible for communicating signals with a UE. The signals may include a data channel and a control channel.

The storage unit 1520 stores programs related to the operations of the eNB. According to an exemplary embodiment of the present invention, the storage unit 1520 is capable of storing programs for determining the DMRS resource according to the aggregation level for transmitting controls channel to the UE.

The control unit 1530 controls signal flows among the internal function blocks for operations of the eNB.

According to an exemplary embodiment of the present invention, the control unit 1530 sends the UE the control channel configuration information and generates controls channel including the control information. The control unit 1530 also determines the aggregation level for transmitting the control channel and maps the DMRS to the resource elements in a resource block to transmit DMRS and control channel to the UE. The control unit 1530 controls to transmit the control channel to the UE using the DMRS transmitted through the DMRS ports allocated to the UE. The control channel can be the enhanced Physical Downlink Control Channel (E-PDCCH).

According to an exemplary embodiment of the present invention, the control unit 1530 is capable of configuring to transmit DMRS signals to which the same precoding is applied at the two DMRS ports paired in assigning DMRS port when the aggregation level is one of the aggregation levels 2, 4, and 8 or boosting the transmit power of the DMRS port assigned to the UE with the power saved by muting transmission through the other DMRS port as one of the paired DMRS ports.

Figure 16:
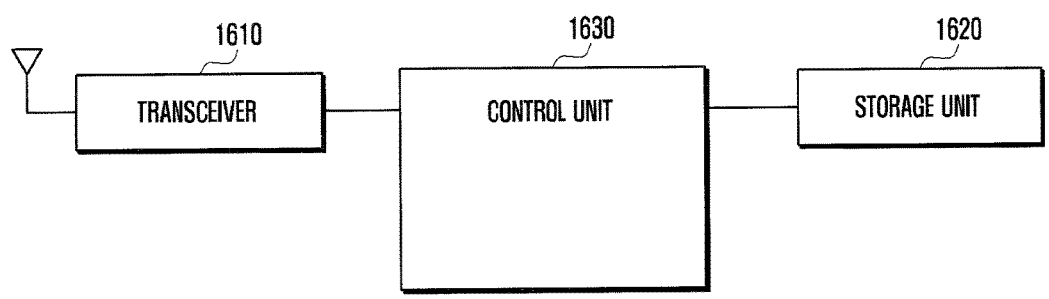
FIG. 16 is a block diagram illustrating a configuration of a UE according to an exemplary embodiment of the present invention.

FIG. 16 is a block diagram illustrating a configuration of a UE according to an exemplary embodiment of the present invention.

Referring to FIG. 16, the UE according includes a transceiver 1610, a storage unit 1620, and a control unit 1630.

The transceiver 1610 is responsible for communicating signals with an eNB. The signals may include data channel and control channel.

The storage unit 1620 stores programs related to the operations of the UE. According to an exemplary embodiment of the present invention, the storage unit 1620 is capable of storing the programs for performing the operation of determining the size of the resource allocated for the control channel depending on the aggregation level for the control channels.

The control unit 1630 controls signal flows among the internal function blocks for operations of the UE.

According to an exemplary embodiment of the present invention, the control unit 1630 receives the control channel configuration information from the eNB and determines the aggregation level for the control channel transmission to configure a search space for detecting control channel in the resource block from the eNB. The control unit performs blind decoding in the search space to receive the control channel. The control channel can be the enhanced Physical Downlink Control Channel (E-PDCCH).

According to an exemplary embodiment of the present invention, the control unit 1630 performs channel estimation under the assumption that the DMRS signal to which the same precoding is applied at the two DMRS ports paired in assigning DMRS port is received when one of the aggregation levels 2, 4, and 8 is assumed or that the transmit power of the DMRS port assigned to the UE has been boosted with the power saved by muting transmission through the other DMRS port as one of the paired DMRS ports.

As described above, the control channel transmission method and apparatus according to exemplary embodiments of the present invention is advantageous in that the eNB is capable of informing the UE of DMRS configuration implicitly in order for the UE to determine the size and location of the control channel addressed to the UE without extra signaling, resulting in improvement of resource utilization efficiency and reduction of load.

Also, the control channel transmission method and apparatus according to exemplary embodiments of the present invention is advantageous in that the UE is capable of determining the allocated DMRS ports based on E-CCE to which E-PDCCH is mapped and estimating channel based on DMRS signals without extra information exchange between the eNB and UE when the E-PDCCH is transmitted in the localized mode, resulting in minimization of overhead.

It should be understood to those skilled in the art that various modifications can be made to the particular exemplary embodiments and application scope of the invention without departing from the ideal of the invention, and therefore the above descriptions are not to be construed as limitative of the invention. Thus, the present invention is not limited to the particular exemplary embodiments disclosed but will include the following claims and their equivalents.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method by a base station in a wireless communication system, the method comprising:
   transmitting configuration information on a control channel to a terminal;
   determining an aggregation level for use in transmitting the control channel;
   mapping a demodulation reference signal (DMRS) to first resource elements in a resource block, the first resource elements corresponding to a first DMRS port;
   determining to boost, if second resource elements, corresponding to a second DMRS port, in the resource block are not used for transmitting the DMRS, a transmit power of the first resource elements corresponding to the first DMRS port with a transmit power of the second resource elements corresponding to the second DMRS port; and
   transmitting the DMRS and control channel to the terminal using the boosted transmit power,
   wherein the determining to boost the transmit power comprises determining to boost, if the aggregation level is one of levels 4 and 8, the transmit power of the first resource elements with the transmit power of the second resource elements.

2. The method of claim 1, wherein the mapping of the DMRS comprises determining the first resource elements to which the DMRS is mapped based on at least one of a resource block number, a subframe index, a cell identifier, or a terminal identifier.

3. The method of claim 1, further comprising transmitting information on the first and second resource elements to the terminal through higher layer signaling.

4. The method of claim 1, wherein the control channel is not mapped to the first and second resource elements.

5. A method by a terminal in a wireless communication system, the method comprising:
   receiving configuration information on a control channel from a base station;
   determining first resource elements to which a demodulation reference signal (DMRS) is mapped in a resource block, the first resource elements corresponding to a first DMRS port assuming an aggregation level for use in transmitting the control channel;
   determining, if second resource elements, corresponding to a second DMRS port, in the resource block are not used for transmitting the DMRS, to assume that a transmit power of the first resource elements corresponding to the first DMRS port is boosted with a transmit power of the second resource elements corresponding to the second DMRS port; and
   receiving the DMRS and control channel based on the boosted transmit power,
   wherein the determining to assume that the transmit power is boosted comprises assuming, if the aggregation level is one of levels 4 and 8, that the transmit power of the first resource elements is boosted with the transmit power of the second resource elements.

6. The method of claim 5, wherein the determining of the first resource elements comprises mapping the DMRS to the first resource elements determined based on at least one of a resource block number, a subframe index, a cell identifier, or a terminal identifier.

7. The method of claim 5, further comprising receiving information on the first and second resource elements at the terminal through higher layer signaling.

8. The method of claim 5, wherein the control channel is not mapped to the first and second resource elements.

9. A base station in a wireless communication system, the base station comprising:
a transceiver configured to communicate with a terminal; and
a control unit configured to:
control transmitting configuration information on a control channel to the terminal,
determine an aggregation level for use in transmitting the control channel,
map a demodulation reference signal (DMRS) to first resource elements in a resource block, the first resource elements corresponding to a first DMRS port,
determine to boost, if second resource elements, corresponding to a second DMRS port, in the resource block are not used for transmitting the DMRS, a transmit power of the first resource elements corresponding to the first DMRS port with a transmit power of the second resource elements corresponding to the second DMRS port, and
control transmitting the DMRS and control channel to the terminal using the boosted transmit power,
wherein the control unit is configured to:
determine to boost the transmit power of the first resource elements with the transmit power of the second resource elements if the aggregation level is one of levels 4 and 8.

10. The base station of claim 9, wherein the control unit is further configured to control determining the first resource elements to which the DMRS is mapped based on at least one of a resource block number, a subframe index, a cell identifier, or a terminal identifier.

11. The base station of claim 9, wherein the control unit is further configured to control transmitting information on the first and second resource elements to the terminal through higher layer signaling.

12. The base station of claim 9, wherein the control channel is not mapped to the first and second resource elements.

13. A terminal in a wireless communication system, the terminal comprising:
a transceiver configured to communicate with a base station; and
a control unit configured to:
control receiving configuration information on a control channel from the base station,
determine first resource elements to which a demodulation reference signal (DMRS) is mapped in a resource block, the first resource elements corresponding to a first DMRS port assuming an aggregation level for use in transmitting the control channel,
determine, if second resource elements, corresponding to a second DMRS port, in the resource block are not used for transmitting the DMRS, to assume that a transmit power of the first resource elements corresponding to the first DMRS port is boosted with a transmit power of the second resource elements corresponding to the second DMRS port, and
control receiving the DMRS and control channel based on the boosted transmit power,
wherein the control unit is configured to:
determine to assume that the transmit power is boosted comprises assuming that the transmit power of the first resource elements is boosted with the transmit power of the second resource elements if the aggregation level is one of levels 4 and 8.

14. The terminal of claim 13, wherein the control unit is further configured to control mapping the DMRS to the first resource elements determined based on at least one of a resource block number, a subframe index, a cell identifier, or a terminal identifier.

15. The terminal of claim 13, wherein the control unit is further configured to control receiving information on the first and second resource elements at the terminal through higher layer signaling.

16. The terminal of claim 13, wherein the control channel is not mapped to the first and second resource elements.

* * * * *